United States Patent [19]

Banski et al.

[11] 4,288,246

[45] Sep. 8, 1981

[54] SEPARATION OF ALUMINUM FROM ARTICLES COMPOSED OF ALUMINUM BONDED TO FERROUS METAL

[75] Inventors: Thomas J. Banski, Kenosha; Robert J. Riedner, Big Bend, both of Wis.

[73] Assignee: Outboard Marine Corporation, Waukegan, Ill.

[21] Appl. No.: 106,554

[22] Filed: Dec. 26, 1979

[51] Int. Cl.³ .............................................. C22B 21/06
[52] U.S. Cl. ....................................... 75/68 R; 75/63; 75/93 AC; 75/44 S; 75/65 R
[58] Field of Search ................... 75/44 S, 63, 93 AC, 75/68, 65

[56] References Cited

U.S. PATENT DOCUMENTS

| 2,620,269 | 12/1952 | Haney et al. | 75/63 |
| 3,650,730 | 3/1972 | Derham | 75/93 AC |
| 3,695,919 | 10/1972 | Brondyke | 75/68 |

*Primary Examiner*—M. J. Andrews

*Attorney, Agent, or Firm*—Michael, Best & Friedrich

[57] ABSTRACT

The method is effective for separating substantially all of the aluminum from an article composed of an aluminum part bonded to a ferrous metal part. The article, such as a die cast aluminum engine cylinder block including one or more cast iron cylinder sleeves, is immersed in a molten salt bath maintained at a temperature above the melting point of the aluminum and retained in the bath a sufficient time for all the aluminum to melt and flow away from the cylinder sleeve, while maintaining the cylinder sleeve out of contact with molten aluminum accumulating in the bath. The resulting substantially aluminum-free sleeve is removed from the bath and residual salt on the exposed surfaces is removed, such as by washing with a hot detergent solution and rinsing with hot water. If the cylinder sleeve is acceptable for reuse, the salt bath is maintained at a temperature below about 1340° F. in order to prevent deterioration of the metallurgical properties of the sleeve.

10 Claims, 4 Drawing Figures

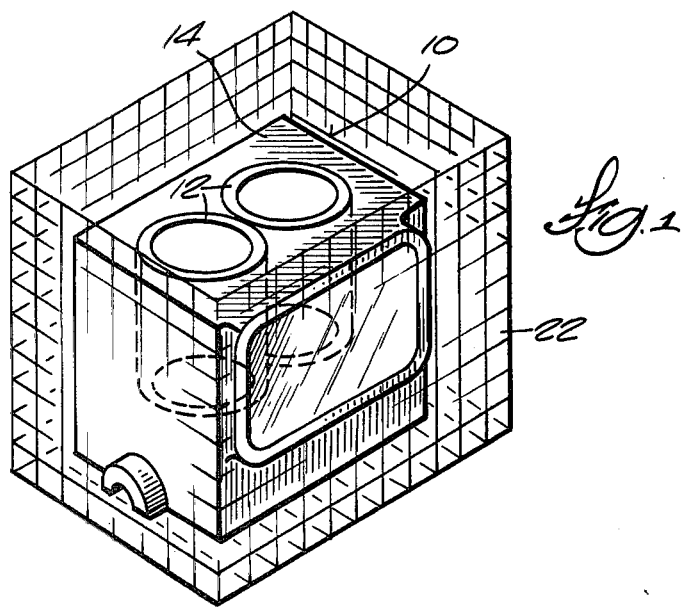
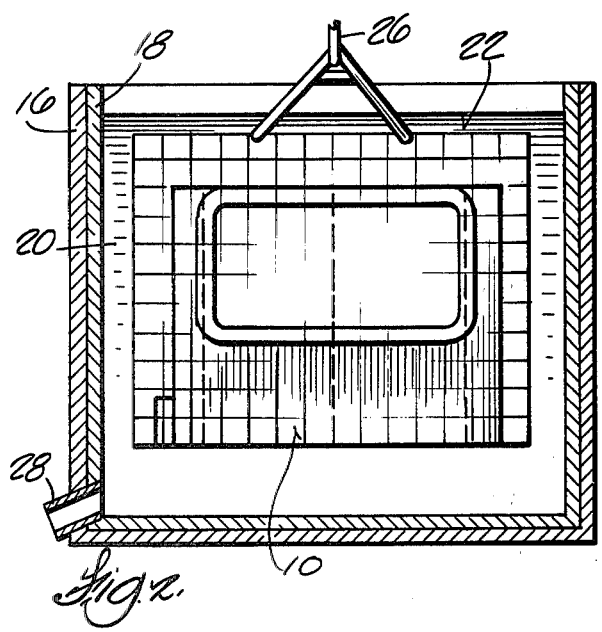
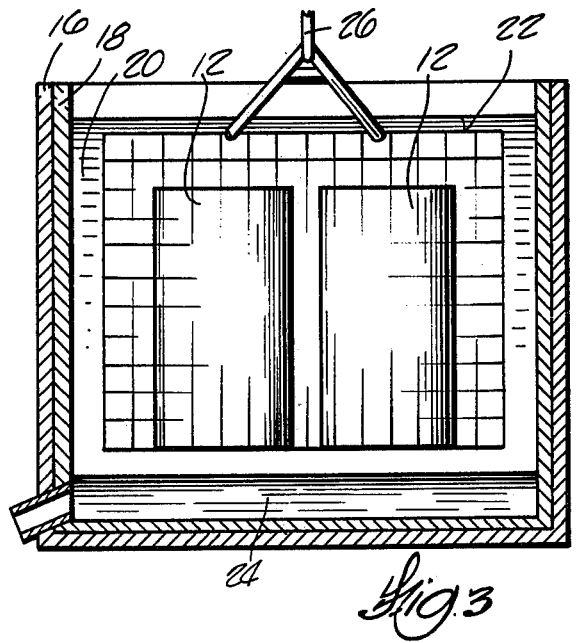
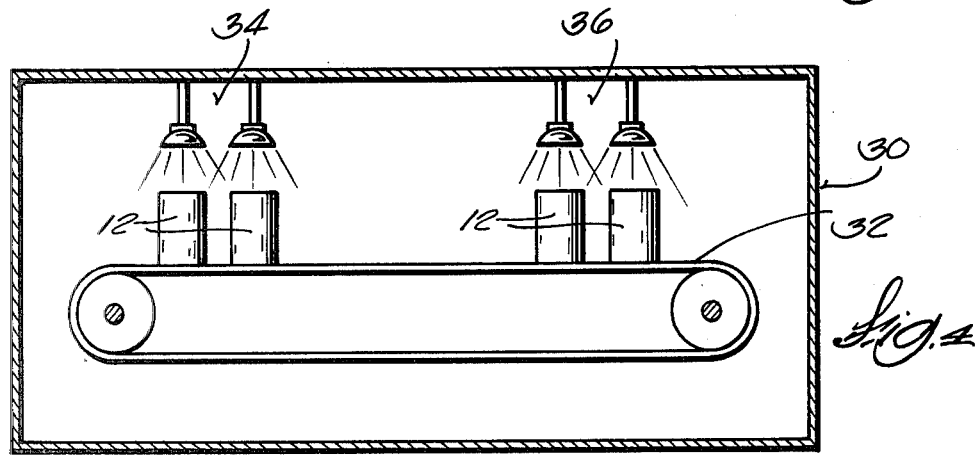

SEPARATION OF ALUMINUM FROM ARTICLES COMPOSED OF ALUMINUM BONDED TO FERROUS METAL

BACKGROUND OF THE INVENTION

This invention relates to a method of separating aluminum or aluminum alloys from an article composed of an aluminum or aluminum alloy part bonded to a ferrous metal part and, in one aspect, to a method for reclaiming cast iron cylinder sleeves from aluminum cylinder blocks for internal combustion engines.

Various articles include an aluminum or aluminum alloy part bonded to a ferrous metal part. For example, cylinder blocks for internal combustion engines commonly are formed by die casting an aluminum alloy around wear-resistant, cast iron cylinder sleeves. When such blocks are rejected during manufacture because a failure to meet quality control requirements or salvaged for scrap, it is desirable to reclaim both the aluminum alloy and the cast iron sleeves. Two types of procedures have been used in the past for this purpose.

In one type procedure, the cylinder block is heated to the temperature above the melting point of the aluminum alloy and tumbled, vibrated or otherwise mechanically agitated until the sleeves are separated from the block.

In another type procedure, the cylinder block is placed in a furnace and heated to a temperature above the melting point of the aluminum alloy and the molten aluminum flows from the sleeves. Aluminum forms a tenacious bond with the cast iron sleeves and cannot be completely removed by melting alone with this procedure. The amount of aluminum remaining on the sleeves varies depending upon the aluminum alloy composition, the melting temperature used, etc., and a separate treatment, such as leaching with a caustic solution, is required to remove all the aluminum. In addition to the added cost and time required for this removal treatment, the aluminum removed during this step cannot be economically recovered. If the sleeves are suitable for reuse, the melting temperature must be kept below a predetermined level in order to prevent damage to the sleeves. Consequently, it often is difficult to control the temperature at a level which facilitates maximum removal of the aluminum without causing deterioration of the metallurgical properties of the sleeves.

It is known to use molten salt baths for recovering aluminum form various substances. For example, the Robinson U.S. Pat. No. 1,180,435, issued April 25, 1916, relates to the use of a molten bath of sodium chloride and cryolite for recovering aluminum from metal-bearing substances containing aluminum in its elemental state. The Burkhardt U.S. Pat. No. 2,787,592, issued Apr. 2, 1957, relates to the use of a molten salt bath for recovering aluminum from aluminum base scrap metals containing a heavier metal. The bath has a specific gravity higher than aluminum, but lower than the heavier metal, causing the molten aluminum to float. The Wainer U.S. Pat. No. 3,000,766, issued Sept. 19, 1961, relates to the use of a molten bath of an alkali metal nitrite, at a temperature below the melting point of aluminum, for separating organic non-metallic materials from aluminum. The Racunas et al U.S. Pat. No. 3,846,123, issued Nov. 5, 1974, relates to the use of a mechanically agitated molten salt bath for separating aluminum from non-metallic solids.

None of these patents relate to the use of a molten salt bath for separating aluminum from a article composed of an aluminum part bonded to a ferrous metal part in a manner whereby substantially all the aluminum is removed from the ferrous metal during the melting step.

SUMMARY OF THE INVENTION

The invention provides a method for separating aluminum from an article composed of an aluminum part bonded to a ferrous metal part, which comprises the steps of immersing the article in a molten salt bath maintained at a temperature above the melting point of the aluminum, retaining the article in the molten salt bath a sufficient time for all the aluminum to melt and separate from the ferrous metal part, while maintaining the ferrous metal part out of contact with the molten aluminum accumulating in the bath and removing the resulting substantially aluminum-free ferrous metal part from the bath.

The ferrous metal part can be cleaned by simply removing any residual salt from the exposed surfaces.

A salt bath composed of about 5 to about 10 weight % cryolite, about 5 to about 10 weight % aluminum fluoride, and about 80 to about 90 weight % of a mixture of potassium chloride and sodium chloride provides a superior scrubbing action, i.e., substantial complete removal of the interface layer of aluminum which normally is tenaciously bonded to the ferrous metal part.

If the article includes a ferrous metal part acceptable for reuse, such as a cast iron cylinder sleeve, the salt bath is maintained at a temperature of less than about 1340° F., preferably about 1300° to about 1340° F., in order to prevent deterioration of the metallurgical properties of the ferrous metal part. If the ferrous metal part is being salvaged for scrap, the salt bath temperature can be maintained at a higher temperature, such as about 1400° to about 1450° F.

The article can be preheated prior to the immersion step to reduce the time for aluminum separation.

One of the principal features of the invention is the provision of a simple, inexpensive method for separating aluminum from an article composed of an aluminum part bonded to a ferrous metal part.

Another of the principal features of the invention is a provision of such a method which is capable of removing substantially all the aluminum from the ferrous metal part without deleteriously affecting the metallurgical properties of the ferrous metal part.

A further of the principal features of the invention is the provision of such a method for removing aluminum from an article composed of an aluminum part bonded to a ferrous metal part by employing a molten salt bath.

Other features and advantages of the invention will become apparent to those skilled in the art upon reviewing the following detailed description, the drawing, and the appended claims.

BRIEF DESCRIPTION OF THE DRAWINGS

FIG. 1 is a perspective view of an internal combustion engine cylinder block positioned in a basket ready for immersion in a molten salt bath.

FIG. 2 is a diagrammatic representation of a furnace containing a molten salt bath, showing a basket and engine cylinder block shortly after immersion in the molten salt bath.

FIG. 3 is a view similar to FIG. 4 showing the cylinder sleeves after the aluminum block has been melted away.

FIG. 4 is a reduced diagrammatic representation of a washing appartus for removing residual salt from the cylinder sleeves after the sleeves have been removed from the salt bath.

Before explaining at least one embodiment of the invention in detail, it is to be understood that the invention is not limited in its application to the details of the operating parameters and compositions set forth in the following general description or illustrated in the accompanying drawings. The invention is capable of other embodiments and of being practiced or carried out in various ways. Also, it is to be understood that the phraseology or terminology employed herein is for the purpose of description and should not be regarded as limiting.

GENERAL DESCRIPTION

While the method of the invention can be used for a wide variety of articles composed of an aluminum part bonded to a ferrous metal part, it is particularly adaptable for reclaiming aluminum and cast iron cylinder sleeves from cylinder blocks for internal combustion engines and will be described in connection with that application. As used in the description and the claims, the term "aluminum", unless specifically defined otherwise, encompasses pure aluminum and aluminum base alloys.

Illustrated in FIGS. 1 and 2 is a cylinder block 10 for a two-cylinder internal combustion engine including two cast iron (e.g. class 30 iron) cylinder sleeves 12 integrally bonded in the block 14 formed from an aluminum base alloy (e.g., a 13 Aluminum Alloy including silicon, copper, magnesium, manganese, zinc, iron, nickel, chromium, and titanium). The block 14 is die cast around the cylinder sleeves 12 in a conventional manner during manufacture.

An open, stationary furnace 16, lined with refractory brick 18 and containing a pool or bath of molten salt 20, is used to melt the block 14 away from the cylinder sleeves 12 for the purpose of salvaging of both metals. The salt bath 20 is maintained at a temperature above the melting point of the aluminum by electrical heating elements (not shown) inside the furnace 16.

If the cylinder sleeves 12 are acceptable for use in casting another cylinder block, the salt bath 20 preferably is maintained at a temperature of about 1300° to about 1340° F., most preferably about 1325° F., to obtain complete separation of the aluminum from the cylinder sleeves 12 within a reasonably short period of time without causing deterioration of the metallurgical properties of the cylinder sleeves 12. Temperatures in excess of about 1340° F. can cause a transformation in the metallurgical properties of the iron cylinder sleeves and temperatures below about 1300° F. usually require significantly longer retention times to obtain substantially complete separation of the aluminum.

If the cylinder sleeves 12 cannot be reused and are being salvaged for scrap, complete removal of aluminum is more important than deterioration of metallurgical properties. In that case, the salt bath 20 can be operated at temperatures substantially about 1340° F., for example, about 1400° to about 1450° F. Higher temperatures can be used, but usually are not necessary to obtain substantially complete separation of the aluminum.

The overall cost for such a scrap recovery operation can be reduced by first placing the cylinder block 10 in a so-called "sweat" furnace or reverberatory, dry hearth furnace at a temperature in the order of about 1700° F. to melt away the aluminum from the cylinder sleeves. When the sleeves are raked from the sweat furnace, they are coated with a layer of aluminum, scale and other residue. After cooling, the thus-contaminated cylinder sleeves are immersed in the salt bath 20 to remove substantially all the aluminum, scale and other residue. After removal of residual salt on the exposed surfaces of the cylinder sleeves as described in more detail below, the sleeves are substantially aluminum free and can be used or sold as a high premium scrap because of the absence of aluminum.

Various conventional salts which are compatible with aluminum and ferrous metals can be used for the bath. The exact composition of salt bath is not particularly critical so long as the melting point is below about 1300° F. and the specific gravity is less than aluminum. For instance, acceptable salt compositions include so-called brine residue salts (a mixture of sodium chloride and potassium chloride) and the compositions disclosed in the Grange et al U.S. Pat. No. 2,569,097, issued Sept. 25, 1951, for use in coating ferrous metal parts with aluminum. A salt bath composition found to be particularly suitable because of its superior scrubbing action, or ability to substantially remove the interface layer of aluminum tenaciously bonded to the ferrous metal part, is composed of about 5 to about 10 weight % cryolite ($Na_3AlF_6$), about 5 to about 10 weight % aluminum fluoride, and about 80 to about 90 weight % of a mixture of sodium chloride and potassium chloride. While various amounts of the latter two salts can be used in this specific composition, about 36 to about 42 weight % sodium chloride and about 43 to about 49 weight % potassium chloride is preferred.

Referring to FIG. 1, a cylinder block 10 including reusable cylinder sleeves 12 is placed in a perforated container or basket 22 made from a material which can withstand exposure to the molten salt bath 20 at the elevated temperatures used. Cast iron is suitable for this purpose. Monel, Inconel, other high nickel steels, and low carbon steels deteriorate quite rapidly in the salt bath and generally are not acceptable for this purpose.

As illustrated in FIG. 2, the basket 22 containing an engine block 10 is immersed in the molten salt bath 20 which is heated to a maximum temperature of about 1340° F. as mentioned above. The basket 22 and engine block 10 is retained in the salt bath 20 for a sufficient time to melt substantially all the aluminum away from the cylinder sleeves 12. This time varies depending on the temperature of salt bath, size of the cylinder block, the particular alloy compositon of the block 14, etc. As a general guide, the melting time for a 13 Aluminum Alloy cylinder block of a two-cylinder outboard motor is about 10 to about 20 minutes when a salt bath temperature of about 1325° F. is used. While longer time can be used, it usually is not necessary to melt substantially all of the aluminum away from the cylinder sleeves. This time can be reduced about 50%, e.g., to about 5–10 minutes, by pre-heating the cylinder block 10 to about 400°–700° F. prior to immersion in the salt bath 20.

The molten aluminum 24 settles to the bottom of the furnace as illustrated in FIG. 3 because its specific gravity is greater than the specific gravity of the salt bath 20. This settling can be enhanced by keeping the salt bath quiescent while the engine block 10 is immersed therein, i.e., by not circulating or agitating the bath during this time period. The temperature of the molten aluminum 24 accumulating in the bottom of the furnace 16 often is 100°–150° F. higher than the temperature of the salt bath 20.

In order to prevent deterioration of the metallurgical properties of the iron cylinder sleeves 12 by the hot molten aluminum, the sleeves are maintained out of contact with the molten aluminum. This can be accomplished by suspending the basket 22 from a hook 26 or the like in the salt bath 20 at an elevation above a predetermined level and periodically or continuously removing the molten aluminum 24 through a tap hole 28 or the like in the bottom of the furnace 16 to keep the molten aluminum below the predetermined level. The aluminum withdrawn from the furnace 16 can be reused after removal of impurities, such as paint and the like.

After all aluminum has been melted away from the cylinder sleeves 12, the basket 22 is raised from the salt bath 20. The cylinder sleeves 12 are substantially free of aluminum and the exposed surfaces usually are coated with a thin layer of the salt which is removed in a suitable manner. While various techniques can be used for removing the residual salt, in the specific embodiment illustrated, the cylinder sleeves 12 are washed and rinsed in a washing apparatus 30 diagramatically illustrated in FIG. 4 and including a conveyor 32. The cylinder sleeves 14 are placed on the conveyor 32 after cooling, conveyed through a washing station 34 where they are sprayed with hot, aqueous detergent solution and then conveyed into a rinsing station 36 where they are sprayed with hot water. The cylinder sleeves 12 are ready for use after drying. The same type of apparatus can be used for removing the residual salt from cylinder sleeves salvaged for scrap.

From the foregoing description, it can be seen that the method provided by the invention has several distinct advantages. For instance, substantially all the aluminum can be removed from a ferrous metal part at temperatures below a level where deterioration of the metallurgical properties of the ferrous metal part occurs, instead of the excessively high temperatures required by some prior processes employing reverberatory or rotary furnaces. Instead of requiring an additional step (e.g., a caustic cleaning step) for removing the interface layer of aluminum tenaciously bonded to the ferrous metal part, the ferrous metal part is substantailly aluminum free and the only cleaning required is removal of residual salt. The rapid heat transfer from the molten salt bath reduces the time required as compared to atmospheric furnaces. There is very little, if any atmospheric pollution.

Various of the features of the invention are set forth in the following claims:

What is claimed is:

1. A method for separating aluminum from an article composed of an aluminum part bonded to a ferrous metal part, said method comprising the steps of immersing the article in a molten salt bath composed of about 5 to about 10 weight % cryolite, about 5 to about 10 weight % aluminum fluoride and about 80 to about 90 weight % of a mixture of sodium chloride and potassium chloride, having a specific gravity less than that of the aluminum, and maintained at a temperature above the melting point of the aluminum, retaining the article in said bath a sufficient time for substantially all the aluminum to melt, to separate from the ferrous metal part, and to settle in said bath, maintaining the ferrous metal part out of contact with the molten aluminum accumulating in said bath, and removing the resulting substantially aluminum-free ferrous metal part from said bath.

2. A method according to claim 1 wherein said salt bath includes about 43 to about 49 weight % potassium chloride and about 36 to about 42 weight % sodium chloride.

3. A method according to claim 1 wherein the article is a cylinder block for an internal combustion engine and includes an aluminum block and cast iron cylinder sleeves.

4. A method according to claim 1 wherein said salt bath is maintained at a temperature of about 1300° to about 1340° F.

5. A method according to claim 1 wherein said salt bath is maintained at a temperature of about 1400° to about 1450° F.

6. A method according to claim 1 wherein the engine block is heated to a temperature of about 400° to about 700° F. prior to immersion in said salt bath.

7. A method according to claim 1 including the step of removing residual salt from the exposed surfaces of the ferrous metal part.

8. A method according to claim 7 wherein residual salt is removed from the ferrous metal part by first washing the part with a hot soap solution and then rinsing it with hot water.

9. A method for separating aluminum from a cylinder block for an internal combustion engine and including an aluminum block and at least one cast iron cylinder sleeve, said method comprising the steps of immersing the cylinder block in a molten salt bath having a specific gravity less than that of the aluminum and composed of about 5 to about 10 weight % cryolite, about 5 to about 10 weight aluminum flouride, about 43 to about 49 weight % potassium chloride and about 36 to about 42 weight % sodium chloride and maintained at a temperature of about 1300° to about 1340° F., retaining the cylinder block in said bath a sufficient time for substantially all the aluminum to melt, to separate from the cylinder sleeve, and to settle in said bath, maintaining the cylinder sleeve out of contact with the molten aluminum accumulating in said bath, removing the cylinder sleeve from said salt bath, and removing residual salt from the exposed surfaces of the cylinder sleeve.

10. A method for reclaiming a cast iron cylinder sleeve from a cast aluminum cylinder block of an internal combustion engine, said method comprising the steps of heating the cylinder block to a temperature substantially above the melting point of aluminum to melt all the aluminum away from the cylinder sleeve except for an interface layer of aluminum bonded to the cylinder sleeve, immersing the thus-treated cylinder sleeve in molten salt bath having a specific gravity less than that of the aluminum and composed of about 5 to about 10 weight % cryolite, about 5 to about 10 weight % aluminum flouride, about 43 to about 49 weight % potassium chloride, and about 36 to about 42 weight % sodium chloride and maintained at a temperature in excess of about 1400° F., retaining the cylinder sleeve in said bath a sufficient time for the layer of aluminum to melt, to separate from the cylinder sleeve, and to settle in the bath, maintaining the cylinder sleeve out of contact with molten aluminum accumulating in said bath, removing the cylinder sleeve from said bath, and removing residual salt from the exposed surfaces of the cylinder sleeve.

* * * * *